(12) United States Patent
Gupta et al.

(10) Patent No.: US 7,017,021 B2
(45) Date of Patent: Mar. 21, 2006

(54) HIGH-SPEED MESSAGE FORWARDING LOOKUPS FOR ARBITRARY LENGTH STRINGS USING PIPELINED MEMORIES

(75) Inventors: Pankaj Gupta, Mountain View, CA (US); Srinivasan Venkatachary, Sunnyvale, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 1047 days.

(21) Appl. No.: 09/827,270

(22) Filed: Apr. 4, 2001

(65) Prior Publication Data

US 2002/0146009 A1 Oct. 10, 2002

(51) Int. Cl.
*G06F 12/00* (2006.01)

(52) U.S. Cl. .................................... 711/169
(58) Field of Classification Search ................. 711/169
See application file for complete search history.

(56) References Cited

U.S. PATENT DOCUMENTS

| | | | | |
|---|---|---|---|---|
| 5,410,670 | A | * | 4/1995 | Hansen et al. ............... 711/169 |
| 5,502,834 | A | * | 3/1996 | Arata et al. .................. 711/169 |
| 5,586,299 | A | * | 12/1996 | Wakerly ....................... 711/149 |
| 6,209,020 | B1 | | 3/2001 | Angle et al. |
| 6,343,072 | B1 | | 1/2002 | Bechtolsheim et al. |
| 6,519,682 | B1 | * | 2/2003 | Richardson et al. ......... 711/122 |
| 6,691,124 | B1 | * | 2/2004 | Gupta et al. ................. 707/101 |
| 6,772,268 | B1 | * | 8/2004 | Kristiansen et al. ......... 710/308 |

* cited by examiner

*Primary Examiner*—Matthew D. Anderson
(74) *Attorney, Agent, or Firm*—Kevin L. Daffer; Daffer McDaniel, LLP

(57) ABSTRACT

The invention provides a method and system for lookup of message header information that has the advantages of low-power, speed, and flexibility. The invention uses a sequence of pipelined on-chip memories, each having only a portion of the header information intended for lookup. Each one of the on-chip memories simultaneously performs a lookup on a portion of the header information, allowing embodiments of the invention to operate on multiple messages worth of header information substantially simultaneously. The invention uses a novel data structure for recording destination addresses in the sequence of on-chip memories, having the property that moving information about destination addresses, or otherwise responding to changes in network topology is flexible, while at the same time maintaining relatively dense usage of the on-chip memories. The novel data structure allows embodiments of the invention to find the longest match destination address with no substantial additional processing over random-access memory lookup.

18 Claims, 2 Drawing Sheets

HIGH-SPEED MESSAGE FORWARDING LOOKUPS FOR ARBITRARY LENGTH STRINGS USING PIPELINED MEMORIES

BACKGROUND OF THE INVENTION

1. Field of the Invention

This invention relates to message forwarding, such as for example in a computer network, wireless network or intra or inter computer communication system.

2. Related Art

In interconnection networks, individual devices communicate with each other using messages, which are forwarded using a collection of routers (or switches) from a source device to a destination device. Messages include header information, which is used by the routers to determine how to treat those messages. For example, each router must decide which next-hop router to forward a message to so that the message ultimately reaches its proper destination.

There are at least three concerns each router must address when forwarding messages. First, routers perform a lookup for routing information in response to packet header information. Second, routers schedule the packet for sending in response to a result of the lookup operation. Third, routers forward the packet to an output queue for sending, and actually send the packet to a next hop location.

When performing the lookup operation, there are further concerns each router must address. First, routers need a rapid technique for determining how to treat the message in response to the destination address, including obtaining the "longest prefix match" for the header information. Second, routers need an efficient technique for recording all known destination prefixes addresses in memory and for updating that memory in response to changes in network topology. (While this operation does not take place for each lookup, the router still performs the operation from time to time.) Given the so-far rapid growth of the Internet, and the consequent rapid growth in both the number of possible destinations and the number of routing table entries, every step in this process requires accuracy and would benefit from speed.

The "longest prefix match" problem may be shown by an example. The destination address of a message directed to MIT maybe routed a first way; such messages may include a prefix that is broad and general. The destination address of a message directed to MIT's School of Architecture may be routed a second way, different from the first way and having priority over the first way. These distinctions and priorities are made by looking up the destination address in a table that associates a destination address with a next hop router and give preference to table entries that match the longest part of the destination address (this is referred to as "longest match"). Given the rapid expansion of the Internet, tables are relatively large and growing relatively rapidly. Hence, identifying the "longest match" has become increasingly difficult.

Longest prefix matching can be performed using a TCAM (ternary content addressable memory) or by using various different algorithms such as different trie structures. Both TCAMs and the various different algorithms have numerous drawbacks. TCAMS have relatively low memory density, perform at a limited clock speed, and so require multiple chips in order to achieve either relatively high speeds or relatively large table sizes.

Moreover, algorithms used in lookups have relatively large and elaborate data structures, thus requiring the use of off-chip memory (additional memory not integrated onto the same chip as the lookup circuits).

Known methods of matching destination addresses primarily use off-chip memory, in which the router (or switch) communicates with a memory device using a memory bus to retrieve information about routing messages. When off-chip memory is used, the memory can be either very dense but relatively slow, such as DRAM, or can be very fast but relatively less dense, such as off-chip SRAM. Using DRAM, the speed with which the router can reference memory (and the amount of bandwidth for memory access) limits the speed at which the router can process header information. The relative lesser density of off-chip SRAM means that the router uses multiple SRAM devices for the same amount of storage, and therefore devotes a relatively large number of its input/output pins to accessing memory (also limiting the ability to quickly access large amounts of memory). Either of these drawbacks severely limits the speed with which the router can operate.

Alternatively, routers may use "on-chip" memory, in which the router includes memory with routing information integrated onto the same monolithic semiconductor circuit with intelligent logic. However, on-chip SRAM memory sizes are relatively limited, so that relatively compact or small data structures are preferred. On-chip DRAM memory sizes are less limited, but on-chip DRAM is comparatively slow, and therefore less suitable for rapid lookup.

TCAMs have the advantage of not requiring large and elaborate data structures, because they are specially designed for the purpose of lookup, but they have relatively high power usage, low speed and low density. Avoiding specialized memories leads to using other data structures, which in the known art are relatively large and therefore use multiple memory devices—either multiple DRAM chips (to achieve larger storage), or multiple SRAM chips (to achieve higher speed).

Accordingly, it would be desirable to provide a technique for lookup of message header information that is not subject to drawbacks of the known art. This can be achieved using aspects of the invention in which a relatively compact and smaller data structure is used in combination with pipelined on-chip memory.

SUMMARY OF THE INVENTION

The invention provides a method and system for lookup of message header information that has the advantages of (1) the relative low scaling factor for power usage associated with the use of a random access memory such as SRAM, which has relatively constant power requirement relative to the amount of stored data, over that of associative memories such as TCAM, which has power requirement proportional to the amount of stored data, (2) the relative flexibility, associated with the use of a random access memory such as SRAM, over that of more specialized memories such as TCAM, (3) the relative speed associated with on-chip memory over that of off-chip memory or associative memory. The invention includes methods and systems for lookup using pipelined on-chip memory to access any relatively compact and smaller data structures stored on-chip; one such relatively compact data structure is described in the incorporated disclosure, as referred to herein.

In a first aspect of the invention, lookups are performed using a sequence of pipelined on-chip memories, each having only a portion of the header information intended for lookup. Each one of the sequence of on-chip memories simultaneously performs a lookup on a portion of the header information, thus allowing embodiments of the invention to operate on multiple messages worth of header information substantially simultaneously. Even though each one lookup might take the full sequence of on-chip memories to complete, the router is still able to receive and to process one message for each memory cycle. Lookup speed is limited only by on-chip memory speed, rather than by additional limitations of the known art. Given that on-chip memory is the fastest of all available types of memory, lookup speed (and therefore router capability) scales well with raw technology. Moreover, the use of a pipelined on-chip memory is particularly cost effective.

The invention has general applicability to compact memory storage and retrieval, to update of information recorded in relatively compact form, and to applications having utility for data lookup. None of these applications are limited specifically to lookup for message header information, nor are they necessarily related to the specific applications disclosed herein. For example, embodiments of the invention can include one or more of, or some combination of, the following applications:

Routers and switches at all levels of the ISO/OSI networking model, including without limitation: bridges, network gateways, network routers and switches.

Emulation of an associative memory with contiguous prefix masking, including applications other than routing or switching.

Both fixed-length and variable-length lookups in various types of lookup tables, such as for example for different protocols such as IP, Ethernet, MPLS, and different message types, such as for example unicast, multicast, and the like.

DESCRIPTION OF THE PREFERRED EMBODIMENT

The invention is described herein with regard to preferred steps and data structures. Those skilled in the art will recognize, after perusal of this application, that the described steps and data structures are not limited to any particular circuits. Rather, those of ordinary skill in the art would be able to implement the described steps and data structures, and equivalents thereof, without undue experimentation or further invention. All such implementations are within the scope and spirit of the invention.

Related Applications

Inventions described herein can be used in conjunction with inventions described in the following documents:

U.S. patent application Ser. No. 09/826,556, Express Mail Mailing No. EL734816260US, filed the same day in the name of the same inventors, titled "Compact Data Structures for Pipelined Message Forwarding Lookups".

This document is hereby incorporated by reference as if fully set forth herein. This document is referred to as the incorporated disclosure.

A preferred embodiment includes data structures and memories as further described in the incorporated disclosure.

Lexicography

The following terms refer or relate to aspects of the invention as described below. The descriptions of general meanings of these terms are not intended to be limiting, only illustrative.

router—in general, any device for performing lookup of message header information against an information database, and for treating messages having that message header information differentially in response to a result of the lookup. For example, a router can act in response to destination IP addresses (for forwarding), in response to destination IP addresses and source IP addresses (for multicast forwarding and for access control), or in response to other packet header fields (for enforcing administrative restrictions or other message routing rules).

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

Figure 1:
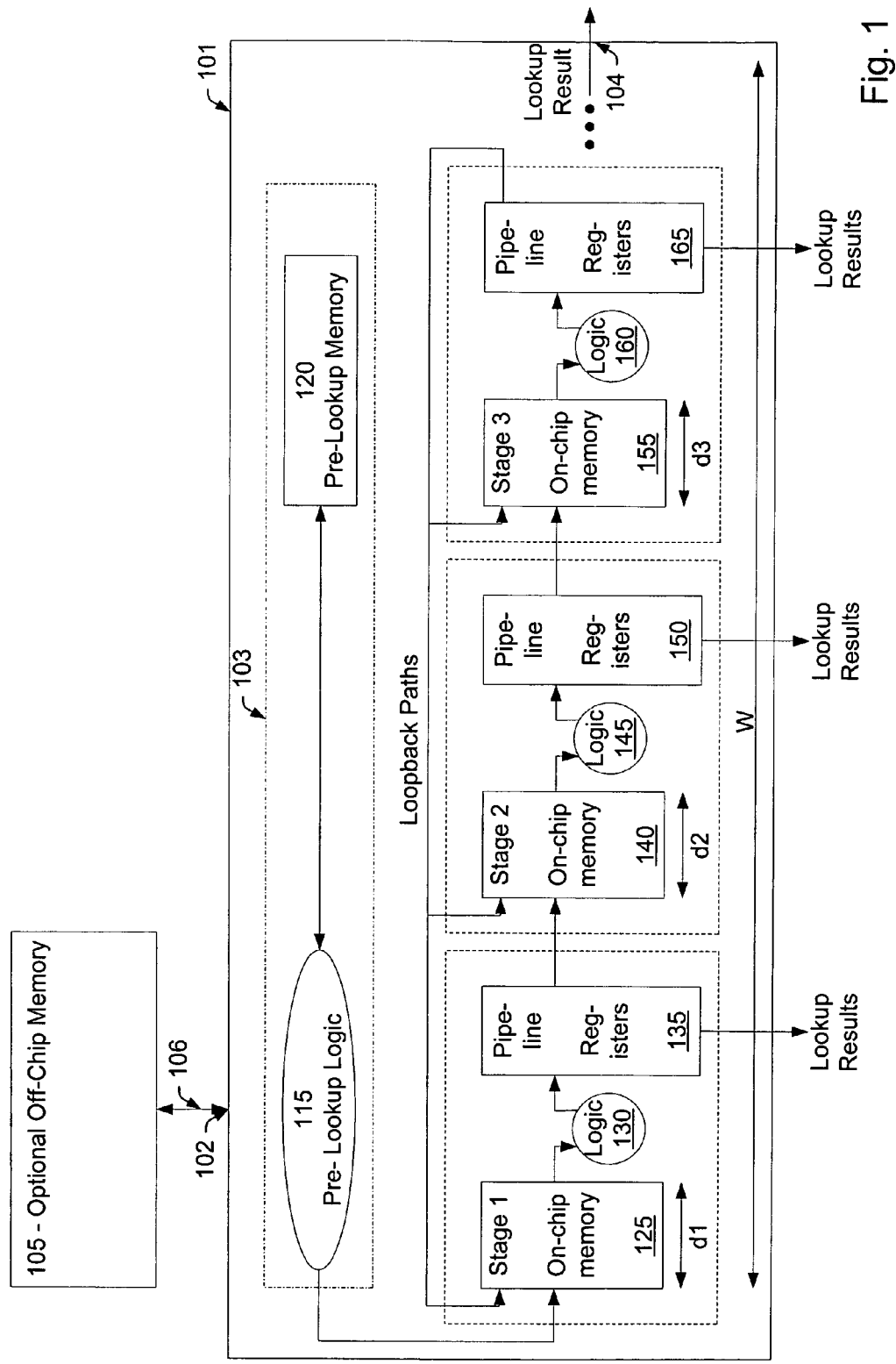
FIG. 1 shows a block diagram of a system for pipelined memory organization for flexible prefix matching.

FIG. 1 shows a block diagram of a system for pipelined memory organization for flexible prefix matching.

A system 100 includes a lookup circuit 101, and can include an (optional) off-chip memory 105, coupled to the lookup circuit 101 using a bus 106 (such as for example a memory bus).

As noted above, the off-chip memory 105 and the bus 106 are optional. A preferred embodiment does not require them, but can include them if desired to provide additional memory accessible by the lookup circuit 101.

In a preferred embodiment, the lookup circuit 101 includes a single monolithic circuit integrated onto at least one side of a silicon wafer ("chip"). Thus, the lookup circuit 101 is preferably integrated onto a single chip, and the sequence of SRAM memories (as further described below) is thus accessible by techniques for accessing "on-chip" memory.

The lookup circuit 101 includes an input port 102, an (optional) pre-lookup circuit 103, a sequence of SRAM memories (as further described below), and an output port 104.

There is no particular requirement that the sequence of memories must be SRAM; they may be DRAM or may other type of on-chip memory or on-chip storage. References to SRAM memory herein should be broadly read to encompass any method of on-chip storage, now known or discovered in the future.

In a preferred embodiment, the input port 102 can be coupled to the bus 106, so as to be included in a larger system in which packet header information is sent to the lookup circuit 101. However, in alternative embodiments, the input port 102 can be directly coupled to an output of a circuit that delivers packet header information, or configured to receive packet header information (or other information) in some other way.

The (optional) pre-lookup circuit 103 includes a set of pre-lookup logic 115 and a pre-lookup memory circuit 120. Information coupled to the input port 102 is coupled to the pre-lookup logic 115 and the pre-lookup memory circuit 120. The pre-lookup memory circuit 120, under control of the pre-lookup logic 115, performs a direct memory lookup for prefix values that are relatively short (that is, smaller than a value d0, a selected number of bits). In embodiments of the invention, d0 can be any value, so long as that value is sufficiently small to allow the lookup circuit 101 to operate effectively (for example, the pre-lookup memory circuit 120 must be fit onto the chip, and there may be other constraints). In a preferred embodiment, d0=14, so prefix values of 14 or fewer bits are all recorded for lookup by the pre-lookup memory circuit 120, which can include a $2^{14}$-entry table.

The packet header information, having a total bit width of w, is coupled to the sequence of SRAM memories. Each stage n in the sequence includes an on-chip SRAM memory, an address lookup circuit, and a pipeline register, and spans dn bits of the total bit width. Thus, a first stage in the sequence includes a first on-chip SRAM memory 125, a first address lookup circuit 130, and a first pipeline register 135, and spans d1 bits of the total bit width; a second stage in the sequence includes a second on-chip SRAM memory 140, a second address lookup circuit 145, and a second pipeline register 150, and spans d2 bits of the total bit width; and so on until a final stage in the sequence includes a final on-chip SRAM memory and a final address lookup circuit (except as described below, there is no particular requirement for a final pipeline register).

In a preferred embodiment, each value dn is selected for optimal processing of a lookup search key. In alternative embodiments, each value dn may be distinct or identical, may be selected to optimize a particular type of lookup, or may be arbitrarily chosen.

In a preferred embodiment, while each SRAM memory has only a selected number of entries, those entries can be quite wide in terms of the number of bits of information they provide, within only the limits of integrating SRAM memories onto a chip. Thus for example, the result provided by an individual entry within one of the SRAM memories can be a data structure having 256 bits, 1K bits, or more, depending on the nature of the data stored therein and the physical size of the SRAM memories as integrated onto the chip.

A result of the lookup operation is coupled to the corresponding stage n address lookup circuit for interpretation. As described below, the lookup operation can provide a final lookup result (or a portion thereof) when there is a prefix entry for a prefix length within the stride of dn bits within the range of the corresponding stage n SRAM memory. Also as described below, the lookup operation can provide a further lookup index into the corresponding next stage n+1 SRAM memory. The address lookup circuit determines from the stage n lookup result whether it includes a final lookup result or a further lookup index.

There is no particular requirement that the further lookup index must point into the corresponding next stage n+1 SRAM memory. In some data structures, the further lookup index may point into a later stage on-chip memory (a "jumping pointer" forward into the sequence of memories), or may point into an earlier stage on-chip memory (a "backward pointer", particularly for loopback or multiple-loopback operation).

An output of the address lookup circuit is coupled to the corresponding stage n pipeline register; the pipeline registers are clocked (preferably using a common clock) so that the lookup operation can proceed at each stage n substantially in parallel. Thus, as described herein, lookup #1 is being partially performed at stage n, lookup #2 is being partially performed at stage n−1, . . . , lookup #n−1 is being performed at stage 2, and lookup #n is being performed at stage 1, all substantially simultaneously.

When a lookup is completed, the final lookup result is coupled to the output port 104.

Loopback Functionality

In a first set of alternative embodiments, the lookup search key may be longer than the width of the sequence of memories, and any remaining portion of the lookup search key not yet referenced may be looped back to an earlier part (such as for example the beginning) of the sequence. Thus, for example, where the packet header information has a total bit width of 2w, the second half can be looped back to the beginning of the sequence of memories, for further processing.

Loopback can be performed multiple times. Where the packet header information has a total bit width of 3w, the second third can be looped back to the beginning of the sequence of memories for further processing, and the final third can be looped back a second time to the beginning of the sequence of memories for further processing.

In this first set of alternative embodiments, a result for the first w bits of the lookup search key is maintained in the final pipeline register, and forwarded with the portion of the lookup search key not yet processed (the second w bits in those cases when the lookup search key is 2w bits wide, or the remaining 2w bits in those cases when the lookup search key is 3w bits wide, and the like) to the stage 1 memory, or to a later stage memory when the lookup search key is not an integer multiple of w bits.

Loopback need not be the very next lookup operation performed. In a preferred embodiment, any intermediate state is recorded with the loopback along with the remaining part of the lookup search key, and the entire looped-back lookup operation is queued with other lookup operations or update operations for being performed in a priority order. This prevents looped-back lookup operations from taking too much of the memory lookup resources available.

This first set of alternative embodiments may be combined with the second set of alternative embodiments, as described below. Thus, the lookup search key may be any width; if more than w bits, the loopback functionality may be used to process the portion of the lookup search key exceeding w bits, while if less than w bits, the multiple-issue functionality (as described below) may be used to insert the lookup search key into a stage n memory for n other than 1.

Multiple-Issue Functionality

In a second set of alternative embodiments, the lookup search key may be inserted into the sequence of memories, and the lookup result may be provided from the sequence of memories, at points other than the beginning and end of the sequence. This has the advantages of (1) allowing for early reporting of lookup results where appropriate; (2) allowing for parallel processing of multiple lookup search keys at once. Thus, for example, if there are 24 stages in the sequence of memories, the first 8 stages may be used for a first lookup, the second 8 stages may be used for a second lookup, and the third 8 stages may be used for a third lookup, all in parallel, thus providing a tripled lookup rate.

In this second set of alternative embodiments, a set of multiple-issue logic (not shown) inserts the lookup search key into the pipeline of memories at a stage n memory (for n other than 1) and extracts the lookup result from the pipeline of memories at a stage n memory (for n other than w). The multiple-issue logic determines, for each lookup search key, where to insert the lookup search key and where to extract the lookup result, so that parallel multiple issue of lookup results may be achieved for multiple lookup search keys. In the example above, the multiple-issue logic would determine which subsequence of the pipelined memories each lookup search key would be assigned to.

As noted above, the first set of alternative embodiments may be combined with the second set of alternative embodiments, so that portions of lookup search keys less than w bits may be processed using multiple-issue functionality while portions of lookup search keys when those lookup search keys exceed w bits may be processed using loopback functionality.

Method of Use

Figure 2:
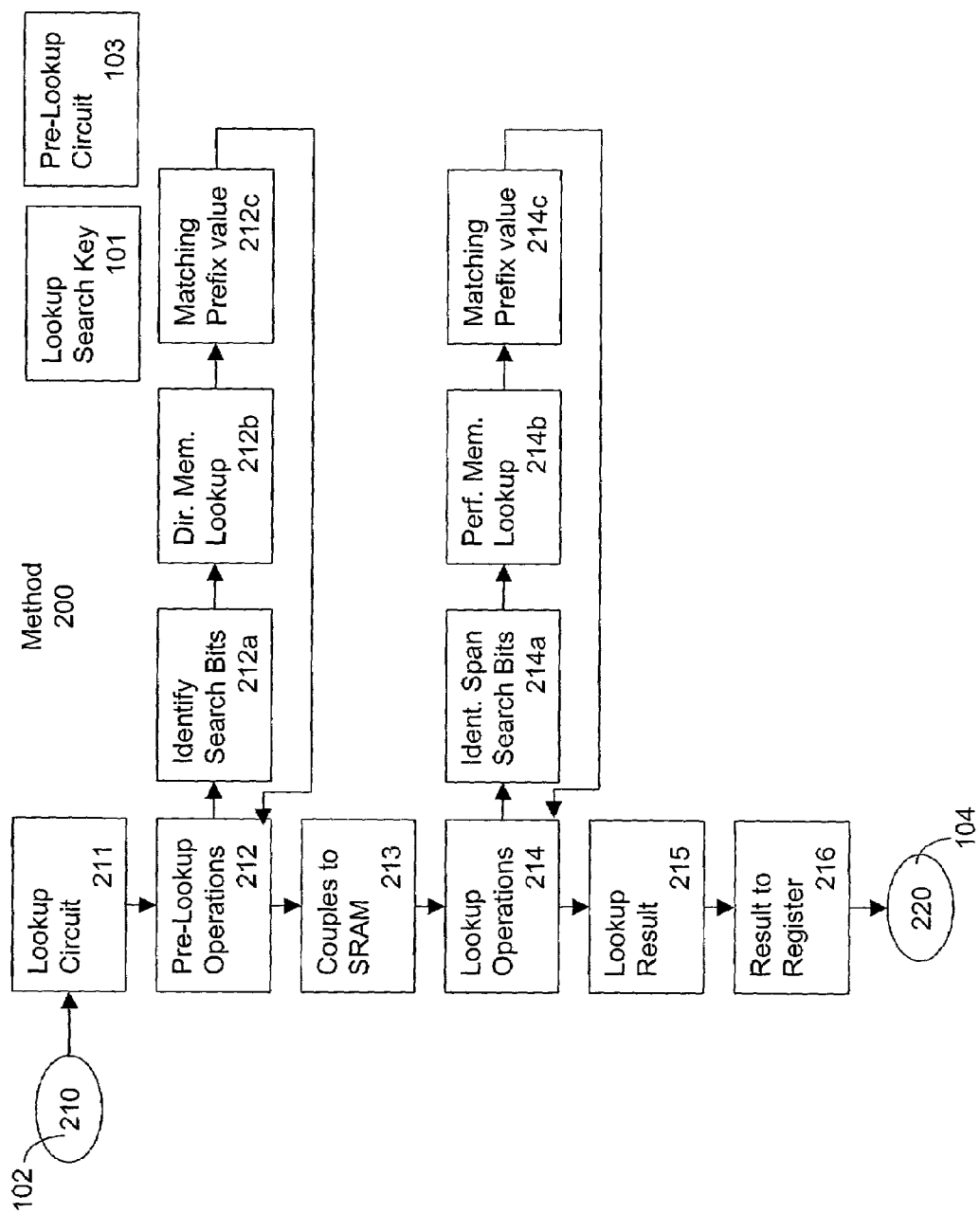
FIG. 2 shows a process flow diagram of a method for storage and retrieval of information using a system for pipelined memory organization for flexible prefix matching.

FIG. 2 shows a process flow diagram of a method for storage and retrieval of information using a system for pipelined memory organization for flexible prefix matching.

A method 200 includes a set of flow points and process steps as described herein.

Although by the nature of textual description, the flow points and process steps are described sequentially, there is no particular requirement that the flow points or process steps must be sequential. Rather, in preferred embodiments of the invention, the described flow points and process steps are performed in a parallel or pipelined manner.

At a flow point 210, the lookup circuit 101 is ready to receive a lookup search key at the input port 102.

At a step 211, the lookup circuit 101 couples the lookup search key to the pre-lookup circuit 103.

In a preferred embodiment, the lookup circuit 101 also couples an instruction, such as a set of flag bits (not shown) indicating whether the lookup operation is intended to store information in, or retrieve information from, the pipelined memory organization. Although this functionality is described herein as "storing" information, in a preferred embodiment the flag bits can indicate any kind of modify or update operation, such as to clear (that is, delete) an entry, mark an entry invalid, modify an entry to include new packet forwarding information, or otherwise alter the data structure maintained by the sequence of pipelined on-chip memories.

At a step 212, the pre-lookup circuit 103 performs any pre-lookup operations. As noted above, the pre-lookup memory circuit 120, under control of the pre-lookup logic 115, performs a direct memory lookup in response to the lookup search key. As part of this step, the pre-lookup circuit 103 performs the following sub-steps:

At a sub-step 212(a), the pre-lookup circuit 103 identifies the first d0 bits of the lookup search key.

At a sub-step 212(b), the pre-lookup circuit 103 performs a direct memory lookup to search for matching prefix values less than d0 bits in length.

At a sub-step 212(c), if the pre-lookup circuit 103 finds a matching prefix value, it records that prefix value in a pre-lookup best-match register (not shown).

As part of this sub-step, if the flag bits indicate that the lookup operation is to store information, the pre-lookup circuit 103 stores any new information, such as a new prefix value, in the identified location in the pre-lookup memory circuit 120.

At a step 213, the pre-lookup circuit 103 couples the lookup search key to the sequence of SRAM memories.

At a step 214, each stage of the sequence of SRAM memories, in parallel, performs a lookup on its portion of the lookup search key. As part of this step, the sequence of SRAM memories performs the following sub-steps:

At a sub-step 214(a), each stage n in the sequence of SRAM memories identifies a span of dn bits of the lookup search key. As noted above, the number of bits dn might be different for each stage n in the sequence.

At a sub-step 214(b), the nth on-chip SRAM memory performs a memory lookup for a portion of a prefix value, in response to at least a portion of the identified span of dn bits.

At a sub-step 214(c), the nth on-chip SRAM memory couples its lookup result to the corresponding nth address lookup circuit.

As part of this sub-step, if the flag bits indicate that the lookup operation is to store information, and the information to be stored is destined for a portion of the data structure in the nth on-chip SRAM memory, that memory stores any new information, such as a new prefix value, in the identified location therein.

In a preferred embodiment, as described in the incorporated disclosure, more than one stage of the on-chip SRAM memory can cooperate in response to a jointly-identified span of bits, to provide a single lookup result at the last one of those more than one stages.

Accordingly, as described in the incorporated disclosure, if the flag bits indicate that the lookup operation is to store information, more than one stage of the on-chip SRAM memory can cooperate in response to a jointly-identified span of bits, to store any new information, such as a new prefix value, in the identified locations in those stages of the on-chip SRAM memory.

At a step 215, the corresponding nth address lookup circuit processes the lookup result from the corresponding nth on-chip SRAM memory. As part of this step, the corresponding nth address lookup circuit determines if the lookup result is either a final lookup result (or a portion thereof), or an index into a corresponding stage n+1 in the sequence of SRAM memories. If the lookup result is a final lookup result (or a portion thereof), the corresponding nth address lookup circuit records the final lookup result (or portion thereof) in its corresponding nth best-match register (part of the corresponding nth pipeline register).

At step 216, the corresponding nth address lookup circuit couples its output to the corresponding stage n pipeline register. As noted above, the pipeline registers are clocked (preferably using a common clock) so that the lookup operation can proceed at each stage n substantially in parallel.

At a flow point 220, the method 200 is complete, and the final lookup result (if any) is coupled from the final stage best-match register to the output port 104.

As described above, as part of the method, if the flag bits indicate that the operation was to store (or otherwise modify or update) information in the data structure maintained by the pipelined memories, a result of the method 200 is to store information in the data structure synchronously with regard to lookup requests. Thus, each lookup request is performed with regard to a consistent data structure, because storage operations occur explicitly either entirely before or entirely after the lookup request is performed, even though those lookup operations and storage operations are performed substantially concurrently by the pipelined memories.

Changes to the data structure that require more than one individual pass through the sequence of pipelined memory stages are performed (first) by adding any necessary new entries to each memory, and then (second) by adding or altering a pointer that links the new entries to the main data structure accessible by lookup operations. Addition of the final pointer is an atomic act as viewed by lookup operations. Thus, the main data structure, as viewed by lookup operations, is always consistent and is always updated atomically.

As described with regard to additional functionality above, it may occur that the final lookup result is coupled, along with the lookup search key, back to an earlier stage in the sequence of memories for further processing.

Generality of the Invention

The invention has general applicability to compact memory storage and retrieval, to update of information recorded in relatively compact form, and to applications having utility for data lookup. None of these applications are limited specifically to lookup for message header information, nor are they necessarily related to the specific applications disclosed herein. For example, embodiments of the invention can include one or more of, or some combination of, the following applications:

Routers and switches at all levels of the ISO/OSI networking model, including without limitation: bridges, network gateways, network routers and switches.

Emulation of an associative memory with contiguous prefix masking, including applications other than routing or switching.

Both fixed-length and variable-length lookups in various types of lookup tables, such as for example for different protocols such as IP, Ethernet, MPLS, and different message types, such as for example unicast, multicast, and the like.

Moreover, techniques used by a preferred embodiment of the invention for lookup of message header information can be used in contexts other than the specific applications disclosed herein. For example, techniques used by embodiments of the invention for storage and retrieval of information in relatively compact form, and to relatively rapid pipelined data lookup, are all generally applicable to fields other than the specific applications disclosed herein.

Other and further applications of the invention in its most general form would be clear to those skilled in the art after perusal of this application. The invention would be usable for such other and further applications without undue experimentation or further invention.

Although preferred embodiments are disclosed herein, many variations are possible which remain within the concept, scope and spirit of the invention; these variations would be clear to those skilled in the art after perusal of this application.

What is claimed is:

1. A method including
   coupling each one of a sequence of inputs to a sequence of memories, said sequence of memories having a last memory and a next memory corresponding to each said memory, other than said last memory, wherein each said memory is responsive to a distinct portion of information supplied to one of said inputs, and wherein at least some inputs have their information applied to all said memories at least once, and to at least some of said memories at least twice;
   coupling a result from each said memory, other than said last memory, to its corresponding said next memory in said sequence of memories; and
   providing an output of at least one of said memories;
   whereby said sequence of inputs is each coupled to said sequence of memories in a pipelined manner to provide said output at a rate substantially equaling one output as each input is received.

2. A method as in claim 1, including providing results associated with a plurality of said inputs by, accessing different sub-sequences of said memories in parallel.

3. A method as in claim 1, wherein each said input has substantially equal amounts of said information.

4. A method as in claim 1, wherein said sequence of inputs includes at least one of: a destination IP address, an IP address, and packet header information.

5. A method as in claim 1, wherein said sequence of memories are included in a single monolithic integrated circuit.

6. A method as in claim 1, wherein said output is responsive to a sequence of individual memory accesses, each said individual memory access being performed at one of said memories.

7. A method as in claim 6, wherein said sequence of individual memory accesses includes one said individual memory access at each said memory.

8. A method as in claim 6, wherein said sequence of individual memory accesses includes one said individual memory access at each said memory, followed by a second individual memory access at each said memory for at least a subsequence of said memories.

9. A method as in claim 6, wherein said sequence of individual memory accesses includes one said individual memory access at each said memory for only a subsequence of said memories.

10. A method as in claim 1, wherein said sequence of memories collectively include lookup results including at least one datum responsive to each one of said inputs.

11. A method as in claim 10, wherein said lookup results collectively include a set of packet forwarding information.

12. Apparatus including
    a sequence of memories, said sequence having a last memory and a next memory corresponding to each said memory other than said last memory, each said memory being coupled to a distinct portion of one of a sequence of lookup search keys;
    each said memory, other than said last memory, being coupled to its corresponding said next memory in said sequence; and
    whereby each input in a sequence of inputs is coupled to said sequence of memories in a pipelined manner to provide an output at a rate substantially equaling one output as each input is received.

13. Apparatus as in claim 12, wherein a plurality of output registers associated with different memories are each coupled to an output for said apparatus.

14. Apparatus as in claim 12, wherein an output register associated with a memory other than said last memory is coupled to corresponding output distinct from said output for the apparatus.

15. Apparatus as in claim 12, wherein said last memory is coupled to an associated earlier memory in said sequence.

16. Apparatus as in claim 12, wherein said sequence of lookup search keys includes at least one of: a destination IP address, an IP address, and packet header information.

17. Apparatus as in claim 12, wherein said sequence of memories collectively include lookup results including at least one datum responsive to each one of said lookup search keys.

18. Apparatus as in claim 17, wherein said lookup results collectively include a set of packet forwarding information.

* * * * *

UNITED STATES PATENT AND TRADEMARK OFFICE
CERTIFICATE OF CORRECTION

PATENT NO. : 7,017,021 B2
APPLICATION NO. : 09/827270
DATED : March 21, 2006
INVENTOR(S) : Pankaj Gupta et al.

It is certified that error appears in the above-identified patent and that said Letters Patent is hereby corrected as shown below:

In the Claims:

Claim 2, line 66, replace "by," with --by--

Claim 14, line 52, replace "to corresponding" with --to a corresponding--.

Signed and Sealed this

Seventeenth Day of October, 2006

JON W. DUDAS
*Director of the United States Patent and Trademark Office*